(No Model.) 2 Sheets—Sheet 1.
W. BOWN & J. H. HUGHES.
BICYCLE LAMP.
No. 495,661. Patented Apr. 18, 1893.
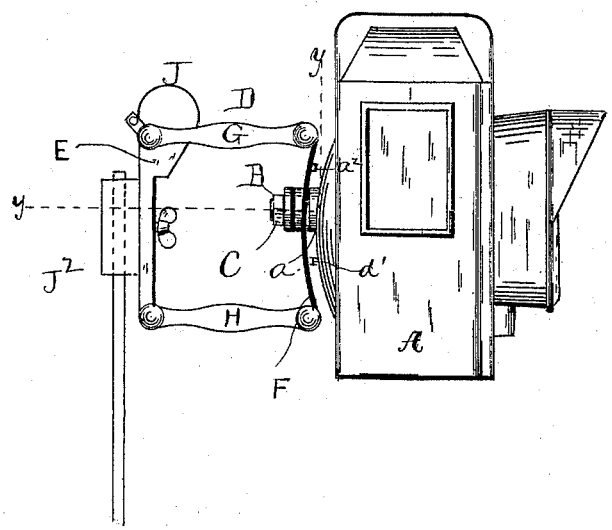
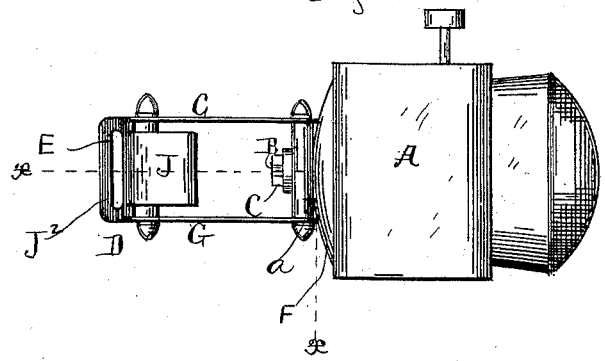
WITNESSES:
H. V. Boswell
Franklin Barritt
INVENTORS:—
William Bown
Joseph H. Hughes.
BY
James H. Lancaster
ATTORNEY.

(No Model.) 2 Sheets—Sheet 2.
W. BOWN & J. H. HUGHES.
BICYCLE LAMP.
No. 495,661. Patented Apr. 18, 1893.
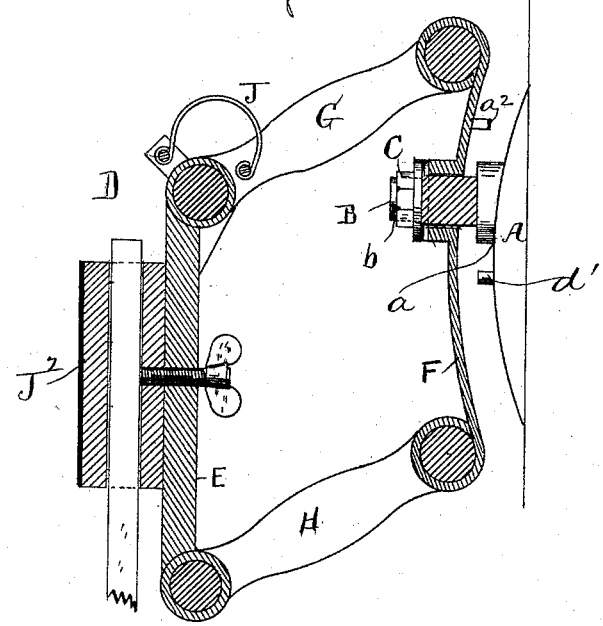
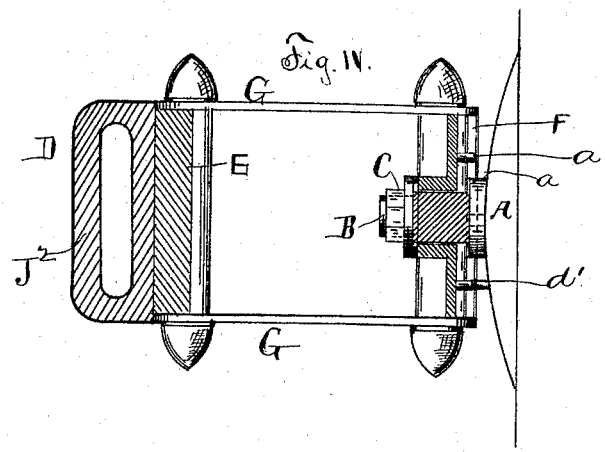
WITNESSES:
H. V. Boswell
Franklin Barritt
INVENTORS:—
William Bown
Joseph Henry Hughes
BY
James N. Lancaster
ATTORNEY.

UNITED STATES PATENT OFFICE.

WILLIAM BOWN AND JOSEPH HENRY HUGHES, OF BIRMINGHAM, ENGLAND.

BICYCLE-LAMP.

SPECIFICATION forming part of Letters Patent No. 495,661, dated April 18, 1893.

Application filed March 3, 1892. Serial No. 423,570. (No model.) Patented in England June 3, 1891, No. 9,376.

*To all whom it may concern:*

Be it known that we, WILLIAM BOWN and JOSEPH HENRY HUGHES, subjects of the Queen of Great Britain, and residents of Birmingham, in the county of Warwick, England, have invented certain new and useful Improvements in Lamps, (for which we have obtained a patent in Great Britain, No. 9,376, dated June 3, 1891,) of which the following is a full, clear, and exact specification thereof.

Our invention relates to bicycle, tricycle and velocipede lamps, and it consists in the manner of attaching the same to the bicycle, tricycle or velocipede, so as to prevent the oil spilling.

Referring to the drawings, Figure 1. is a side view of a lamp embodying our invention. Fig. 2. is a plan view of the same. Fig. 3. is a sectional view on line $x,x$, Fig. 2. Fig. 4. is a sectional view on line $y,y$, Fig. 1.

Letter A, represents the lamp, to the back of which at $a$, is secured the spindle B, with a threaded end $b$, over which is placed the nut C.

D, represents the supporting frame or bracket, consisting of two vertical arms E, F, connected by horizontal arms G, H. All these arms are pivoted to one another so that the frame itself can be folded up against the lamp, and also so that the lamp can have a vertical play upon the machine, and in order to take up this play we provide the frame D, at $d$, with a spring J. The lamp is connected to the frame at $a$, by passing the spindle B, through the arm F, of the frame D, and the boss formed on the outside of said arm. The frame F, is slightly curved in order to conform it to the formation of the back of the lamp. Stop pins $a^2$, and $d'$, are placed on the lamp and frame in order to prevent the lamp swinging too far in one direction. The vertical arm E, is provided with an ordinary rubber box $J^2$, which fits over the bracket of the machine and holds the lamp in position upon the said machine. The arms of the frame D, can be hinged together in any suitable manner that will effect the same.

To use our invention, first place the lamp on the bracket of the machine as shown in Fig. 1. In that position the lamp is held to the machine. If the machine should strike an obstacle or obstruction, the rebound would not be felt by the lamp but be taken up by the spring frame D. Should the machine or bicycle turn on one side, or upset, the lamp will always remain in an upright position, by reason of the spindle, and the manner in which it is secured to one of the arms of the frame D. By this mode of connection, the lamp can move in any direction and should the machine upset or turn on one side, the lamp would always remain in an upright position.

Having thus described our invention, what we claim is—

In a bicycle, tricycle or velocipede lamp, the combination of the following instrumentalities: the supporting frame D, consisting of the vertical curved arm F, and the horizontal arms G, and H, all of said arms being pivoted together as described and shown; the spindle B, connected to the lamp A, and passing through a boss on the curved arm F, and the lamp A, the spring J, secured to the frame D, at $d$, and the lamp A; all arranged substantially as set forth.

In testimony that we claim the foregoing we have hereunto set our hands this 16th day of January, 1892.

WILLIAM BOWN.
JOSEPH HENRY HUGHES.

Witnesses:
MICHL. FLETCHER,
THOMAS MARSTON.